May 13, 1958  J. P. KNIER  2,834,140
TIP-UP WITH ILLUMINABLE SIGNAL
Filed Aug. 29, 1956

Joseph P. Knier
INVENTOR.

BY
Attorneys

United States Patent Office 2,834,140
Patented May 13, 1958

2,834,140

TIP-UP WITH ILLUMINABLE SIGNAL

Joseph P. Knier, Adell, Wis.

Application August 29, 1956, Serial No. 606,863

2 Claims. (Cl. 43—17)

The present invention relates to a tip-up for ice fishing needs and has particular reference to one which has, in addition to the usual day signalling flag, an illuminable night fishing signal.

More particularly, the invention has to do with a wooden or an equivalent pull operated unattended tip-up of the so-called center post type. For example, a tip-up frame such as that shown in the Brundage Patent 2,741,054 will do. The object of the invention is to provide the upper portion of the center post with a novel and improved signal which takes the form of a flashlight and which is novelly constructed and mounted.

Novelty is predicated on a signalling flashlight with a downwardly directed beam which flashes through the hole in the ice and into the water and also provides illumination for the reel to facilitate setting the trigger means which is relied upon in tripping a flag carrying spring and which, in turn, serves as a circuit closer.

The foregoing and other novel features and objectives will appear more fully hereinafter when taken in conjunction with the views of the drawing and description of the details of the views thereof.

Figure 1:
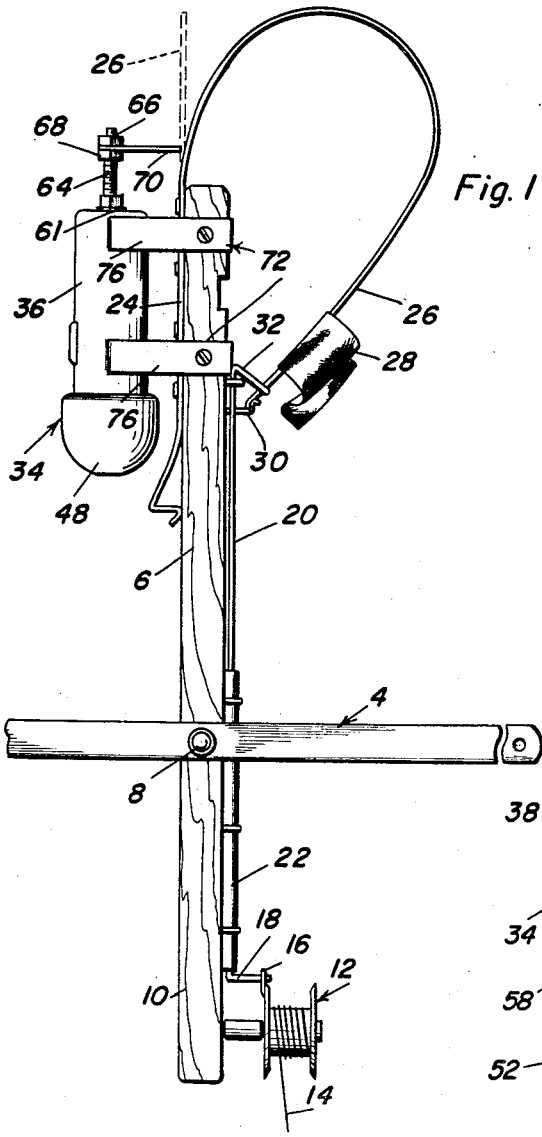
Fig. 1 is an elevational view of at tip-up equipped with the improved automatically operable signalling light.

As before stated, the tip-up frame may be of any suitable construction as for example the one shown in the aforementioned Brundage Patent 2,741,054. Briefly, the tip-up comprises a base frame 4 which in practice is horizontally disposed and spans the usual hole in the ice (not detailed). The center post is denoted at 6 and is hingedly mounted at 8 on the intermediate portion of the base and has a depending portion 10 carrying a reel 12 on which the fishing line 14 is mounted. The head of the reel is provided with a trip finger 16 cooperating with a lateral terminal end portion 18 at the lower end of the trigger rod 20. This rod is mounted for angular rotation in a sheath or tube 22 fixed on the post. A resilient band or arm has one end portion 24 secured to the post, the other end portion 26 being free and provided with a signalling flag 28 for day fishing needs. The free end of the arm or spring is releasably engaged with a keeper 30 and is released from the tensioned position seen in Fig. 1 by way of the upper lateral end 32 of the trigger rod.

Figure 2:
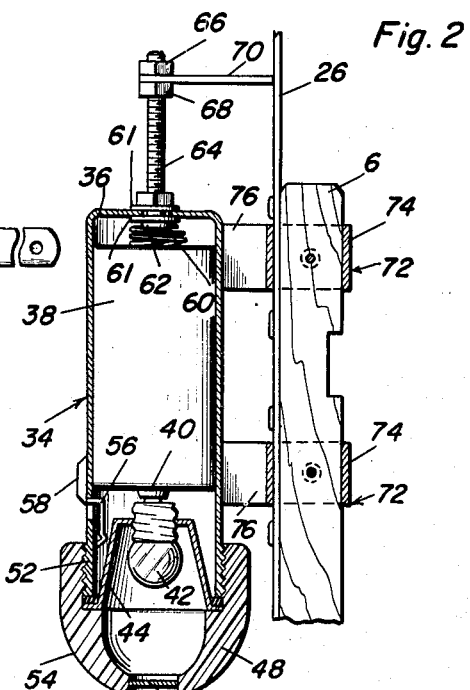
Fig. 2 is a view on an enlarged scale and of a fragmentary type and in section and elevation, with parts omitted, showing the details of construction.
Figure 3:
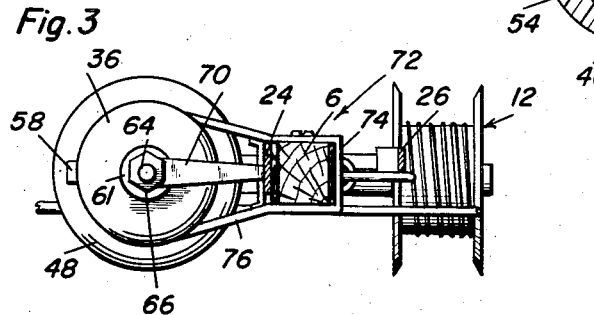
Fig. 3 is a view partly in section of the structure seen in Fig. 1.

The structural details so far covered are old and therefore the present invention is an improved and added structure. In fact, one might even think of it as an attachment for the swingable center post 6. Broadly it pertains to what may be called a flashlight 34. This comprises an appropriate metallic casing 36 containing a dry cell or an equivalent battery 38. The contact 40 on the lower end of the battery is in operative association with the screw-base of the lamp bulb 42 fitted into the reflector 44 and registering with a spot like hole 46 carried by the screw threaded cap 48. Fitted in the hole is a lens 50. The cap itself is threaded at 52 on the downwardly disposed end portion of the casing. The numeral 54 designates an insulated ring interposed between the flange of the reflector and the screw threaded end of the metal case. The switch finger is denoted at 56 and is operable by the sliding push 58. A coil spring 60 cooperates with a contact element 62 on the lower insulated end portion of a screw threaded stud 64. The stud provides a binding post and is suitably insulated at 61 and is provided with cooperating nuts 66 and 68 which serve to hold in place the metal or equivalent circuit closing finger 70. The latter is arranged in the path of movement of the bowed spring or signal arm 26. In Fig. 1 the arm is latched in its so-called set or ready-to-operate position and in the same figure the arm is shown in dotted lines where it is then in the circuit closing position; seen better in full lines in Fig. 2. When in the latter position and assuming that the switch 56 is on, the circuit is closed and the signal is given indicating that a strike has been accomplished.

Suitable U-shaped or equivalent attaching and adapter brackets or clips are provided and these are denoted by the numerals 72 and each comprises a ring or collar portion 74 (Fig. 2) embracing the post and outstanding arms 76 which straddle the flashlight casing and therefore serve as mounting and retaining clips for the flashlight. By anchoring end portion 24 of the aforementioned signal flag carrying arm or spring 26 in and by way of the ring portions 74 and mounting the flashlight as shown the construction is readied to function. It is repeated that in Fig. 1 the tip-up is rigged and set to bring the signalling flag 28 into play when a fish is caught. The flag serves in the daytime. At night when the flag is not easily seen, the flashlight comes into play. Assuming that the flashlight is in the ready-to-use position shown in the drawings, as soon as the arm 26 has been released and swings from the full line to the dotted line position seen in Fig. 1, the arm contacts the circuit closing finger 70 and hence the light comes on and signals that the catch has been made.

It will be evident from the above description that the flashlight 34 is removably mounted on the post with the aid of the brackets 72. More specifically, the collar-like ring portions 74 embrace not only a portion of the post but also contact and embrace the cooperating end portion of the steel band. The metallic flashlight casing is removably supported in parallelism with the post by way of the outstanding arms or so-called spring clips 76 so that the metallic casing itself forms a part of the electric circuit. The fact that the flashlight has a lamp at its bottom it will be evident that the light beam, when the flashlight is on, is projected downwardly toward the base means. The aforementioned circuit make and break finger 70 is adjustably mounted on the upper end of the stud 64 and extends at right angles from the stud and has a free end portion which is arranged for cooperative alignment and engagement with the adjacent free portion of the spring metal band 26.

Since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tip-up comprising, in combination, a post, means for supporting the same in alignment with an ice hole, a line-equipped reel mounted for operation on said post, metal attaching brackets for a flashlight having rings encircling the upper end portion of said post, signalling means comprising a spring metal band having one end portion attached to the upper end of the post by way of said rings and having a free end portion provided with a signalling flag, a keeper on said post at which said free end portion is releasably engageable, a flashlight removably mounted on said post by way of said brackets and provided with a downwardly directed illuminable lamp, said flashlight having a metallic casing with a battery and switch-button-controlled lamp, a screw-threaded stud carried by and projecting above the upper end of said casing, said stud having electrical contact with said battery, and a circuit make and break finger adjustably mounted on the upper end of said stud and disposed at right angles to said stud and having a free-end portion arranged for cooperative alignment and engagement with an adjacent cooperating part of the free end portion of said spring metal band.

2. An ice fishing device comprising, in combination, a tip-up having base means, a center post hingedly mounted between its ends on the central portion of the base means and having portions extending above and below the base means, a fishing line reel mounted on that portion of the post below said base means, a keeper fixedly mounted on one side of the upper end portion of said post, a trigger rod operatively mounted on said one side of said post and having one end releasably cooperable with the reel and the other end extending above and cooperable with said keeper, an elongated spring steel band having one end portion superimposed upon and fixedly secured to the side of the post opposite to that on which said keeper is mounted, said band providing a signalling arm, the other end of the band being free and provided with a signalling flag and being releasably engageable with said keeper, a pair of flashlight accommodating and mounting brackets, each bracket having a collar-like ring embracing a portion of the post and also contacting and embracing a portion of said one end of said steel band, said brackets having spring clips, a flashlight embodying a casing removably supported from the post by way of said clips, said flashlight being approximately parallel with the post and having a lamp at its bottom positioned to focus the light beam downwardly toward the base means, said flashlight having a battery therein and a switch-button-controlled lamp cooperating with a contact at one end of the battery, a stud having its lower end attached to the upper end of the battery casing with said lower end in cooperating electrical contact with the battery, the stud projecting above the upper end of the casing and paralleling an adjacent portion of said band, and a circuit make and break finger adjustably mounted on the upper end of the stud and disposed at right angles to the stud and having a free end portion arranged for cooperative alignment and engagement with the free end portion of said band.

References Cited in the file of this patent

UNITED STATES PATENTS

| | | |
|---|---|---|
| 1,815,662 | Bacon | July 21, 1931 |
| 2,565,379 | Laurila | Aug. 21, 1951 |
| 2,603,900 | Kellett | July 22, 1952 |
| 2,741,054 | Brundage | Apr. 10, 1956 |
| 2,772,407 | Nichols | Nov. 27, 1956 |

FOREIGN PATENTS

| | | |
|---|---|---|
| 463,794 | Canada | Mar. 21, 1950 |
| 616,571 | Germany | Aug. 1, 1953 |